(12) United States Patent
Barber

(10) Patent No.: US 10,906,257 B2
(45) Date of Patent: Feb. 2, 2021

(54) TOOL FOR FORMING A COMPOSITE COMPONENT

(71) Applicant: Rolls-Royce plc, London (GB)

(72) Inventor: Scott Barber, Derby (GB)

(73) Assignee: Rolls-Royce plc, London (GB)

( * ) Notice: Subject to any disclaimer, the term of this patent is extended or adjusted under 35 U.S.C. 154(b) by 471 days.

(21) Appl. No.: 15/568,346

(22) PCT Filed: Apr. 25, 2016

(86) PCT No.: PCT/GB2016/051155
§ 371 (c)(1),
(2) Date: Oct. 20, 2017

(87) PCT Pub. No.: WO2016/174400
PCT Pub. Date: Nov. 3, 2016

(65) Prior Publication Data
US 2018/0141289 A1    May 24, 2018

(30) Foreign Application Priority Data

Apr. 30, 2015 (GB) .................................. 1507418.0

(51) Int. Cl.
*B29C 70/76*    (2006.01)
*B29C 70/46*    (2006.01)
(Continued)

(52) U.S. Cl.
CPC .......... *B29C 70/766* (2013.01); *B29C 70/386* (2013.01); *B29C 70/462* (2013.01);
(Continued)

(58) Field of Classification Search
CPC .................................................. B29C 33/485
(Continued)

(56) References Cited

U.S. PATENT DOCUMENTS 5,348,602 A    9/1994    Makarenko et al.
5,356,692 A  * 10/1994   Perez ...................... B29C 33/30
                                                       118/33
(Continued)

FOREIGN PATENT DOCUMENTS

CN    101583479 A    11/2009
CN    102529108 A     7/2012
(Continued)

OTHER PUBLICATIONS

"Coefficient of friction, Rollng resistance, and Aerodynamics." Available on Apr. 8, 2015. <https://www.tribology-abc.com/abc/cof.htm> (Year: 2015).*

(Continued)

*Primary Examiner* — Matthew J Daniels
*Assistant Examiner* — Hana C Page
(74) *Attorney, Agent, or Firm* — Schwegman Lundberg & Woessner, P.A.

(57) ABSTRACT

There is disclosed a tool (102) for forming a composite component having a curved body and an integral flange from a pre-form (200), the tool comprising: a curved body portion 104 having a lay-up surface (110); and a forming assembly (105) having a lay-up configuration and a forming configuration. The forming assembly comprises: a plurality of forming elements (106) each having a lay-up surface (120) and a primary flange-forming surface (122), the forming elements (106) being radially outwardly moveable between the lay-up configuration and the forming configuration, in which the forming elements are circumferentially spaced from one another; and a plurality of filler elements (107) each having a secondary flange-forming surface (156), the filler elements (107) being arranged to move into the circumferential gaps between the forming elements in the forming configuration so as to form a substantially continu- (Continued)

Figure 1:
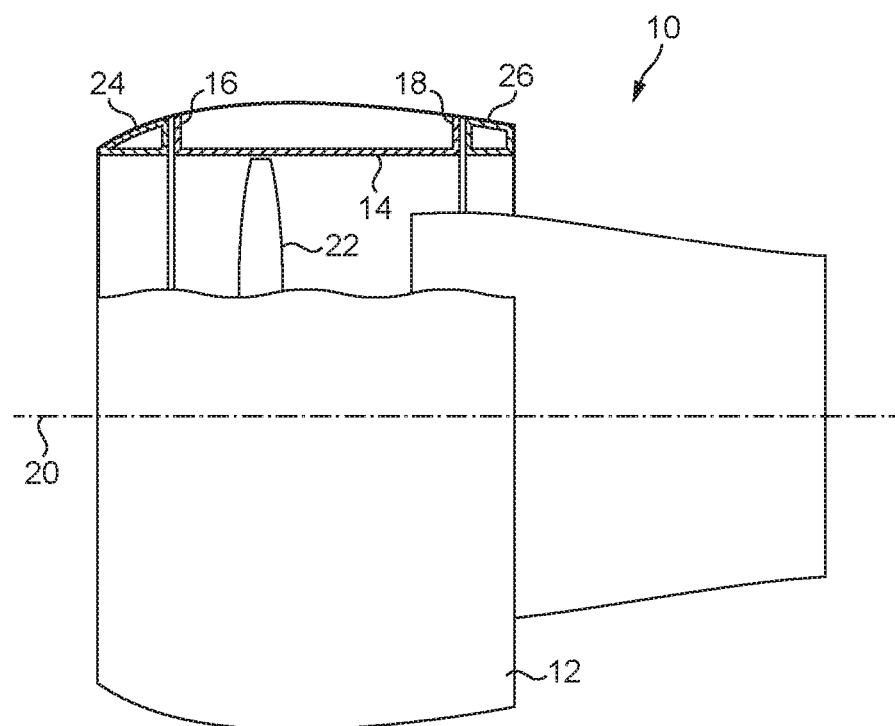

ous flange-forming surface. In use a pre-form (200) is disposed on the layup surfaces of the curved body portion (104) and the forming elements (106), and movement to the forming configuration causes the pre-form (200) to be deformed between the continuous flange-forming surface and a counteracting forming surface to form the integral flange (210).

17 Claims, 7 Drawing Sheets

(51) Int. Cl.
  *B29C 70/56* (2006.01)
  *B29C 70/38* (2006.01)
  *B29K 307/04* (2006.01)
  *B29L 23/00* (2006.01)

(52) U.S. Cl.
  CPC .......... *B29C 70/56* (2013.01); *B29K 2307/04* (2013.01); *B29L 2023/22* (2013.01)

(58) Field of Classification Search
  USPC ........................................................ 156/475
  See application file for complete search history.

(56) References Cited

U.S. PATENT DOCUMENTS

| | | | |
|---|---|---|---|
| 9,289,950 B2* | 3/2016 | Bottome | B29C 33/485 |
| 2013/0074572 A1 | 3/2013 | Bottome et al. | |
| 2013/0266431 A1* | 10/2013 | Moram | B29C 70/342 |
| | | | 415/182.1 |
| 2013/0327472 A1 | 12/2013 | De Mattia | |
| 2017/0100859 A1* | 4/2017 | Register | B30B 3/045 |
| 2018/0154594 A1 | 6/2018 | Moram et al. | |

FOREIGN PATENT DOCUMENTS

| | | |
|---|---|---|
| CN | 103338914 A | 10/2013 |
| EP | 1393875 A1 | 3/2004 |
| EP | 2674278 A1 | 12/2013 |
| GB | 2106030 A | 4/1983 |
| GB | 2486231 A | 6/2012 |
| JP | S49071062 | 7/1974 |
| JP | S57189817 U | 12/1982 |
| JP | S6056525 U | 4/1985 |
| JP | 2014504220 A | 2/2014 |
| WO | WO-2014/042813 A1 | 3/2014 |

OTHER PUBLICATIONS

International Patent Application No. PCT/GB2016/051155, International Search Report and Written Opinion dated Jul. 1, 2016, 10 pgs.
United Kingdom Patent Application No. 1507418.0, Search Report dated Oct. 26, 2015, 4 pgs.
"U.S. Appl. No. 15/568,359, Final Office Action dated Oct. 21, 2019", 12 pgs.
"U.S. Appl. No. 15/568,359, Response filed Sep. 20, 2019 to Non-Final Office Action dated Jul. 10, 2019", 12 pgs.
"Japanese Application Serial No. 2017-556707, Non-Final Office Action dated Nov. 12, 2019", w/ English Translation, 9 pgs.
"Japanese Application Serial No. 2017-556715, Office Action dated Nov. 12, 2010", w/ English Translation, 8 pgs.
"Chinese Application No. 201680024736X, Notification of First Office Action dated Apr. 1, 2019", w/ English Translation, 10 pgs.
U.S. Appl. No. 15/568,359, Examiner Interview Summary dated Jan. 21, 2020, 3 pgs.
U.S. Appl. No. 15/568,359, Non Final Office Action dated Apr. 2, 2020, 14 pgs.
U.S. Appl. No. 15/568,359, Response filed Feb. 19, 2020 to Final Office Action dated Oct. 21, 2019, 16 pgs.
"U.S. Appl. No. 15/568,359, Non Final Office Action dated Jul. 10, 2019", 14 pgs.
"U.S. Appl. No. 15/568,359, Response filed Jun. 7, 2019 to Restriction Requirement dated Apr. 29, 2019", 8 pgs.
"U.S. Appl. No. 15/568,359, Restriction Requirement dated Apr. 29, 2019", 8 pgs.
"Chinese Application Serial No. 201680024459.2, First Office Action dated Apr. 3, 2019", w/ English Translation, 10 pgs.
"International Patent Application No. PCT/GB2016/051156, International Search Report and Written Opinion dated Jul. 4, 2016", 10 pgs.
"United Kingdom Patent Application No. 1507412.3, Search Report dated Oct. 26, 2015", 4 pgs.
U.S. Appl. No. 15/568,359, Examiner Interview Summary dated Jun. 17, 2020, 4 pgs.
U.S. Appl. No. 15/568,359, Response filed Jul. 1, 2020 to Non Final Office Action dated Apr. 2, 2020. 16 pgs.

\* cited by examiner

TOOL FOR FORMING A COMPOSITE COMPONENT

This application is a U.S. National Stage Filing under 35 U.S.C. 371 from International Application No. PCT/GB2016/051155, filed on Apr. 25, 2016, and published as WO 2016/174400 A1 on Nov. 3, 2016, which claims the benefit of priority under 35 U.S.C. § 119 to United Kingdom Patent Application No. 1507418.0, filed on Apr. 30, 2015, each of which is hereby incorporated by reference herein in its entirety.

The invention relates to a tool for forming a composite component.

Composite materials are increasingly used for components that require particular combinations of material properties. In particular, composite materials such as Carbon Fibre Reinforced Polymer (CFRP) are commonly used for components in the aerospace and other industries due to their high stiffness and low weight.

It is frequently desirable to manufacture a component with a flange, such as an annular flange on a casing for a gas turbine, or the sides of a spar for a wing. Where such components are to be manufactured from composite materials, the formation of the flange can pose an engineering problem. For example, it may be difficult to layup composite material on a flanged mould, in particular in the region of bends between the main part of the mould and the flange that may be hard to access.

One known method of manufacturing a composite component with an integral flange is disclosed in GB2486231, which discloses a mould for a composite pre-form having a first portion and a movable second portion comprising a plurality of circumferentially spaced movable sectors. After laying up plies of unidirectional composite tape on the mould, the mould and pre-form are heated in an autoclave and the movable second part is actuated to deform a part of the pre-form to form the flange.

However, the circumferentially spaced sectors of GB2486231 are individually movable and may become misaligned, resulting in a poor quality flange.

It is therefore desirable to provide an improved tool for manufacturing a composite component.

According to a first aspect of the invention there is provided a tool for forming a composite component having a curved body and an integral flange from a pre-form, the tool comprising: a curved body portion having a lay-up surface; and a forming assembly having a lay-up configuration and a forming configuration, the forming assembly comprising: a plurality of forming elements each having a lay-up surface and a primary flange-forming surface, the forming elements being radially outwardly moveable from the lay-up configuration to the forming configuration, in which the forming elements are circumferentially spaced from one another; and a plurality of filler elements each having a secondary flange-forming surface, the filler elements being arranged to move into the circumferential gaps between the forming elements in the forming configuration so as to form a substantially continuous flange-forming surface; wherein in use a pre-form is disposed on the layup surfaces of the curved body portion and the forming elements, and wherein movement to the forming configuration causes the pre-form to be deformed between the continuous flange-forming surface and a counteracting forming surface to form the integral flange.

In the lay-up configuration, the lay-up surfaces of the forming elements may be substantially continuous with one another and with the lay-up surface of the body portion. The body portion of the tool may be for receiving a first region of a pre-form corresponding to the curved body of the composite component. The forming assembly may be adjacent the curved body portion.

The lay-up surfaces of the forming elements may be radially spaced apart from the lay-up surface of the body portion in the forming configuration. The lay-up surface of each forming element may be a radially outer surface of the forming element, and the primary flange-forming surface of each forming element may extend radially inwardly from the respective lay-up surface. Each filler element may have a radially outer filler surface arranged to extend into a gap formed between the radially outer lay-up surfaces of the forming elements in the forming configuration to form a substantially continuous outer forming surface. The filler elements may be concealed radially within the forming elements when the forming assembly is in the lay-up configuration.

The primary and secondary flange-forming surfaces may extend at least partly radially. The primary and secondary forming surfaces may be substantially radially extending (i.e. substantially normal to the axis of the tool).

The forming elements and the filler elements may be alternately arranged around the axis of the tool. Each pair of adjacent forming and filler elements may have complementary features arranged to engage with each other to axially align the elements relative to each other in the forming configuration.

Accordingly, each element engages with its adjacent elements in the forming configuration to ensure that the primary and secondary flange-forming surfaces are substantially continuous with each other when the forming assembly is in the forming configuration. The complementary features of each pair of adjacent forming and filler elements are arranged so that the primary and secondary forming surfaces are axially aligned to within a tolerance of 0.25 millimetres in the forming configuration.

Alternatively, the complementary features of each pair of adjacent forming and filler elements may be arranged so that the primary and secondary forming surfaces are axially aligned to within a tolerance of 0.5 millimetres, or within a tolerance of 0.2 millimetres, or within a tolerance of 0.1 millimetres in the forming configuration.

The complementary features of each pair of adjacent forming and filler elements may be provided on side surfaces of the respective forming and filler elements. The side surfaces may have both a radial extent and an axial extent.

The complementary features of each pair of adjacent forming and filler elements may comprise at least one shoulder formed on a first element of the pair and arranged to engage with a corresponding portion of a second element of the pair to limit axial movement of the second element relative the first element along a first axial direction. The complementary features of each pair of adjacent forming and filler elements may comprise at least two shoulders arranged to limit axial movement of the second element relative the first element along two opposing axial directions. The complementary features of each pair of adjacent forming and filler elements may comprise male and female interlocking features. A first element of the pair of elements may comprise a female groove and a second element of the pair of elements may comprise a male projection arranged to be received in the female groove. The groove and projection may extend radially.

The material composition of the male feature may be different from the material composition of the female feature. In other words, the male and female features may be composed of different materials. The material composition of the male and female features may be different from the material composition of the remainder of the respective forming and filler elements forming the pair. In other words, the male and female features may be composed of a different material to the remainder of the respective forming and filler elements. For example, either one or both of the male and female features may be composed of a material having a different hardness, friction, binding, thermal conduction and/or thermal expansion property than the remainder of the respective elements.

Each element may comprise a male feature provided on a first side surface of the element for engaging with a corresponding female feature of a first adjacent element, and a female feature provided on an opposing second side surface of the element for engaging with a corresponding male feature of a second adjacent element.

The complementary features of the forming elements may be configured so that, in the lay-up configuration, the complementary features of the forming elements engage with each other to axially align the forming elements.

The tool may further comprise a drive means for moving the forming assembly from the lay-up configuration to the forming configuration, the drive means comprising a plurality of drive units, each drive unit being arranged to move at least one forming element; wherein each drive unit is configured to move the or each respective forming element and an adjacent filler element from respective retracted positions corresponding to the lay-up configuration to respective extended positions corresponding to the forming configuration; wherein each drive unit is configured so that the respective filler element reaches its respective forming position after the forming element reaches its respective forming position; and wherein a lost motion connection is provided between each drive unit and the respective forming element. The lost motion connection may comprise a resilient means which biases the forming element away from the drive unit.

Each drive unit may comprise a guide block, the respective forming element may be guided for displacement with respect to the guide block by means of a guide rod or rail, and the resilient means may comprise a spring which acts between the guide block and the forming element. The guide block may be fixedly secured to the filler element so that the filler element cannot move relative to the guide block.

The tool may be for forming an annular or semi-annular component. The tool may be for forming a casing for a gas-turbine engine.

According to a second aspect of the invention here is provided apparatus for forming a composite component having a curved body and an integral curved flange, the apparatus comprising: a tool in accordance with the first aspect of the invention; and a counteracting support detachably attachable to the tool over a pre-form received on the tool, the counteracting support having a counteracting forming surface arranged to oppose the flange-forming surfaces of the forming assembly so that in use a region of the pre-form is deformed between the forming assembly and the counteracting support to form the flange of the component.

According to a third aspect of the invention there is provided a method of forming a composite component having a curved body and an integral curved flange from a pre-form, the method comprising: providing a pre-form over lay-up surfaces of the curved body portion and the forming elements of an apparatus in accordance with the second aspect of the invention in the lay-up configuration; moving the forming assembly from the lay-up configuration to the forming configuration so that the plurality of forming elements move into gaps between the forming elements in the forming configuration so as to form a substantially continuous flange-forming surface; whereby a region of the pre-form is deformed between the continuous forming surface and the counteracting forming surface to form the integral flange. The method may comprise laying-up the pre-form on the tool.

Figure 2:
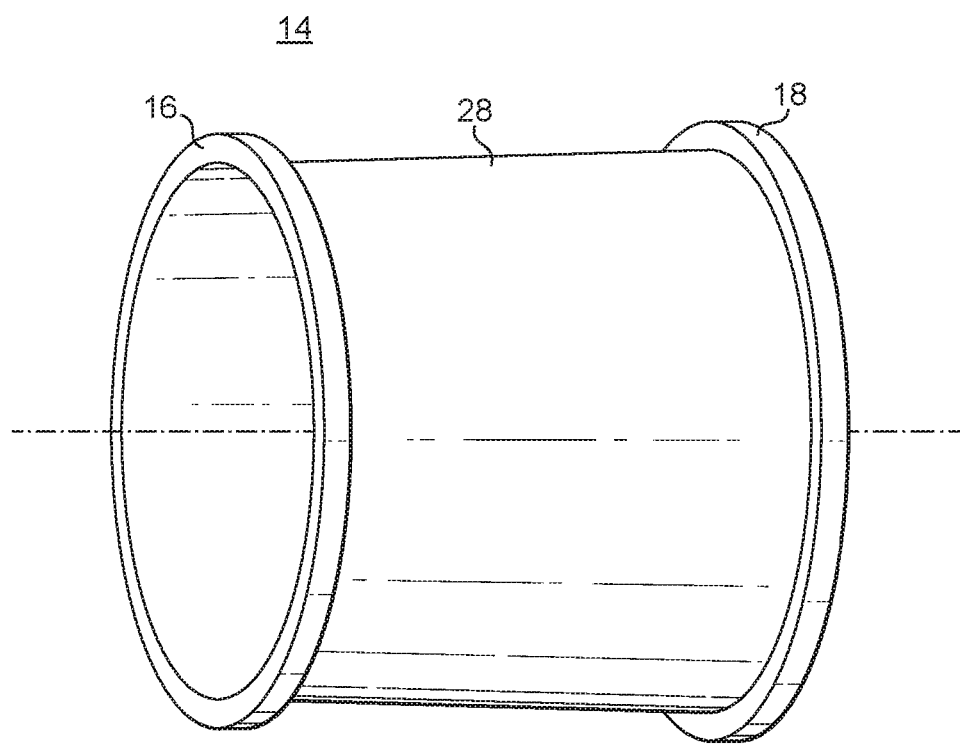
Figure 3:
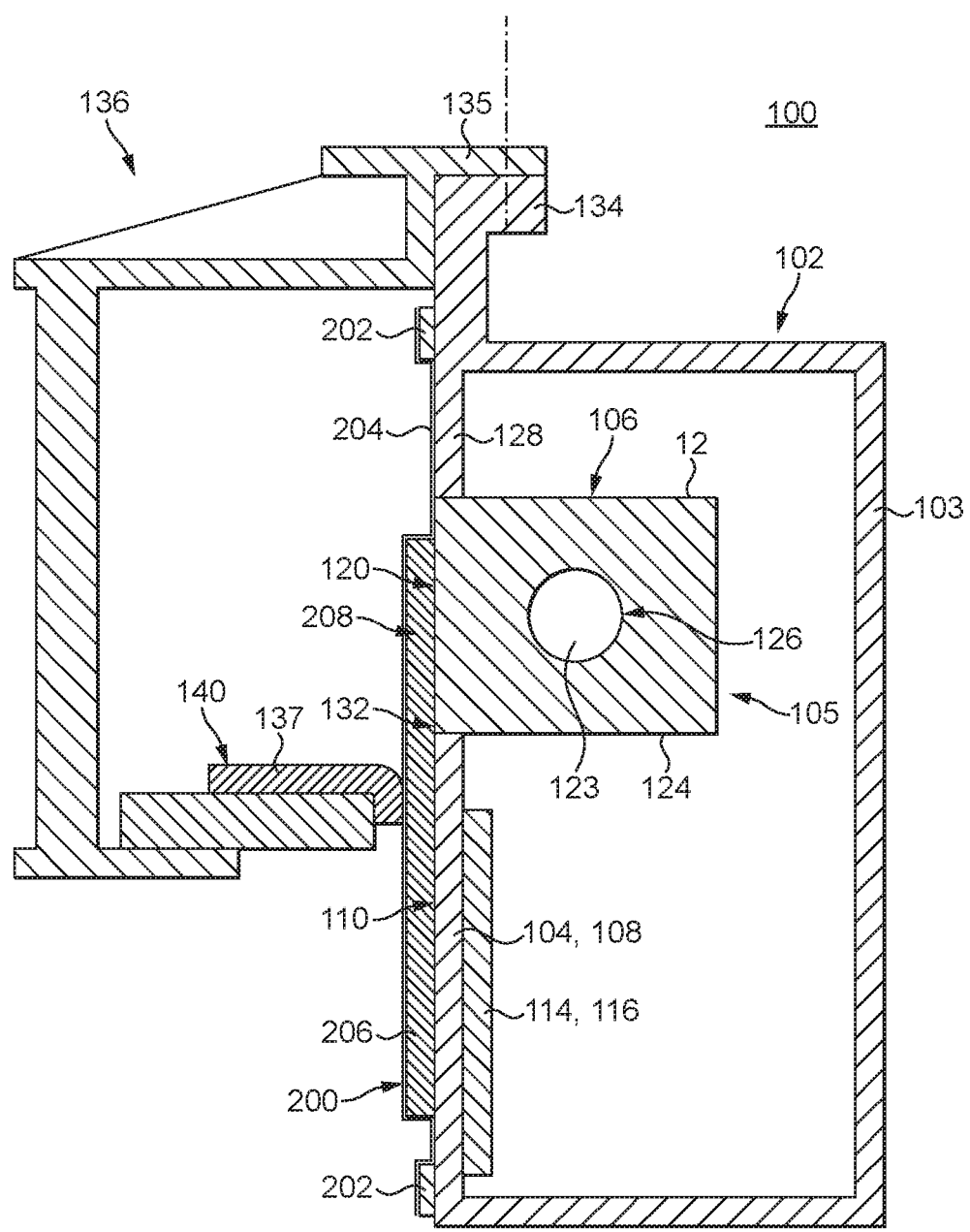
Figure 4:
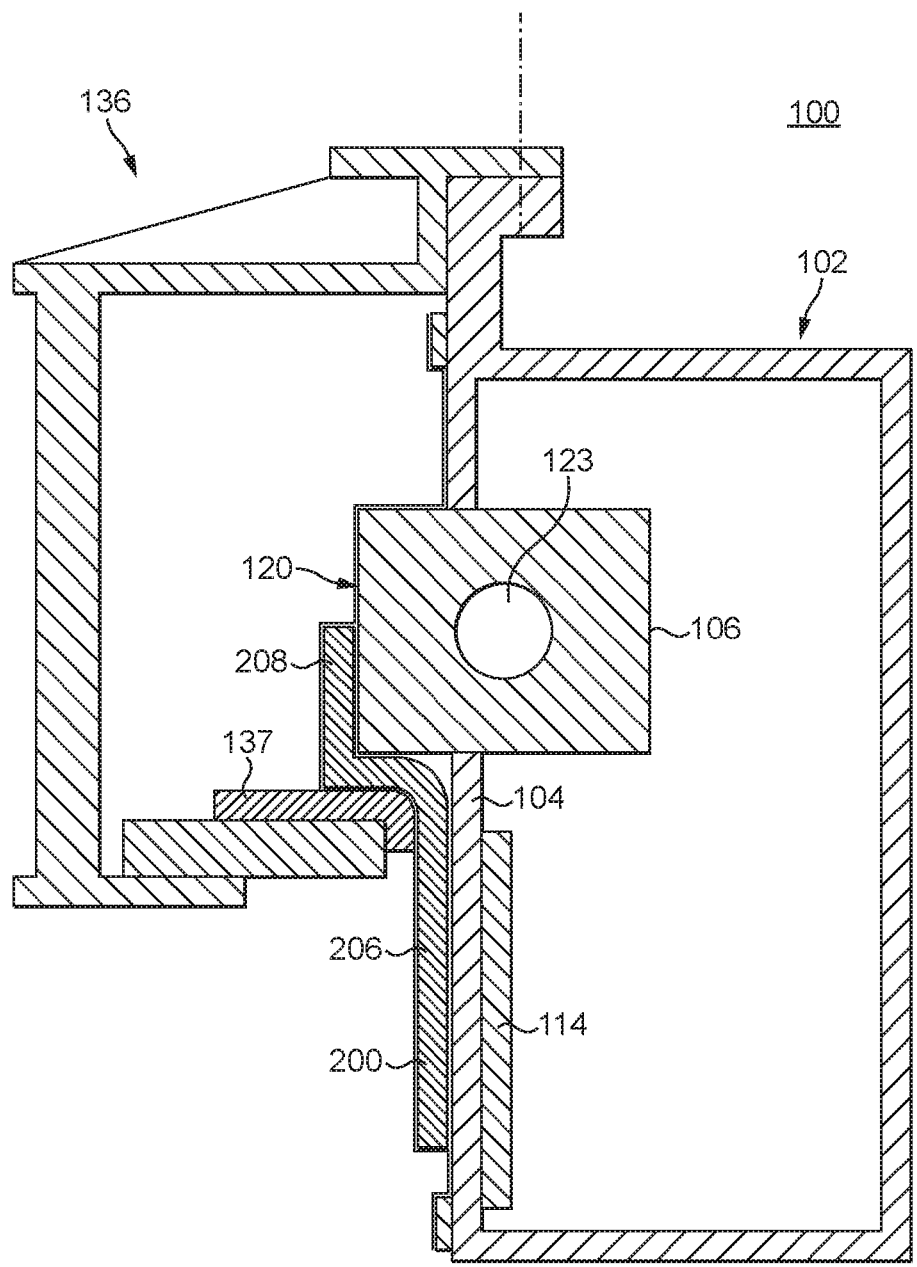
Figure 5:
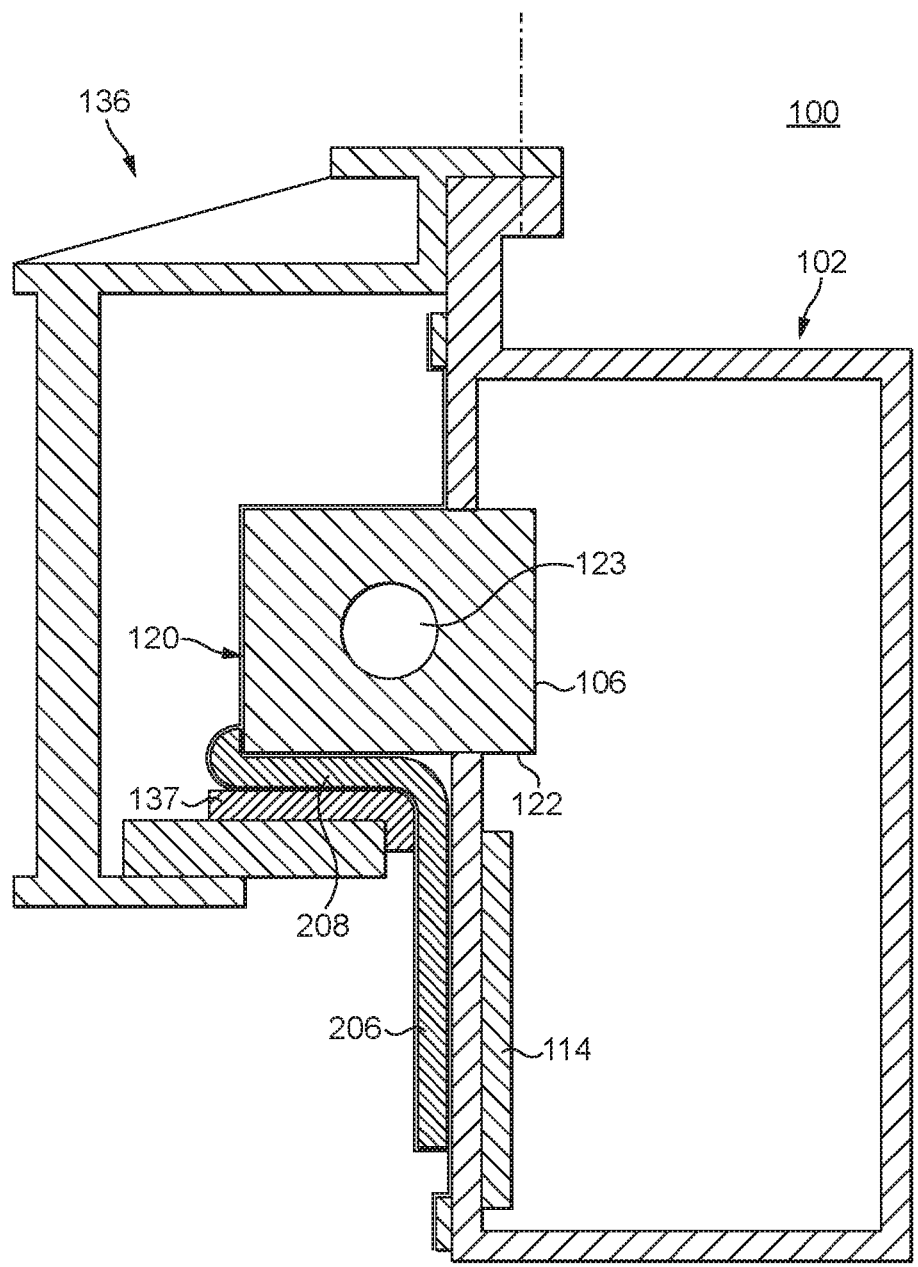
Figure 6:
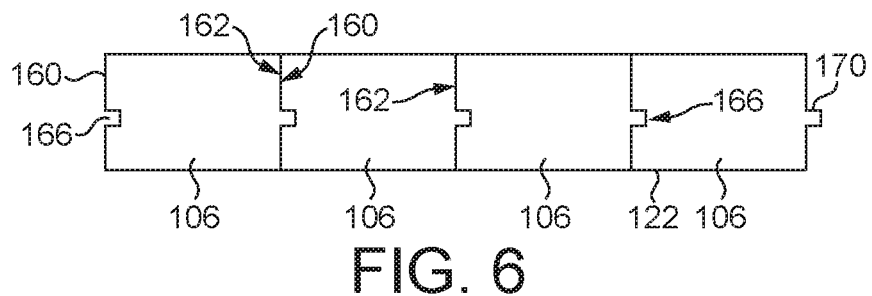
Figure 7:
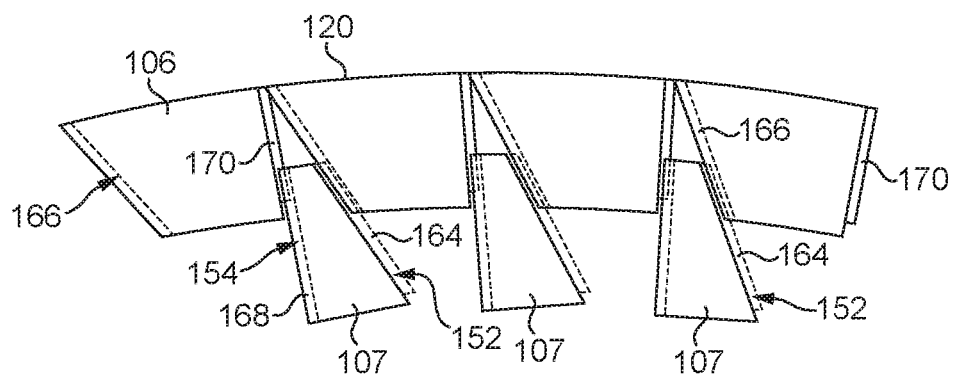
Figure 8:
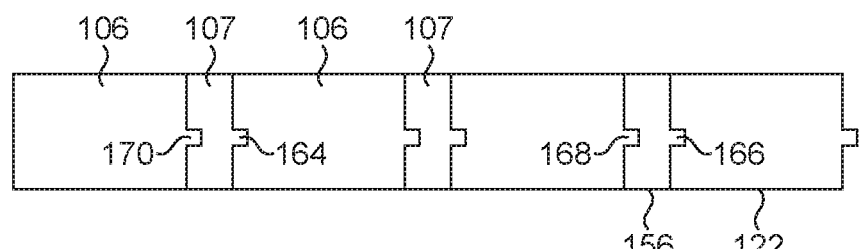
Figure 9:
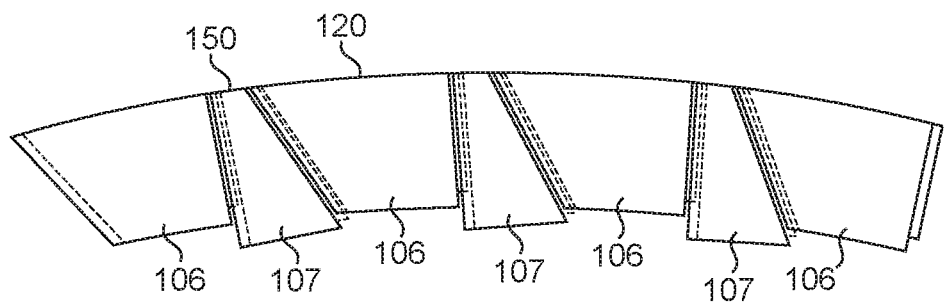
Figure 10:
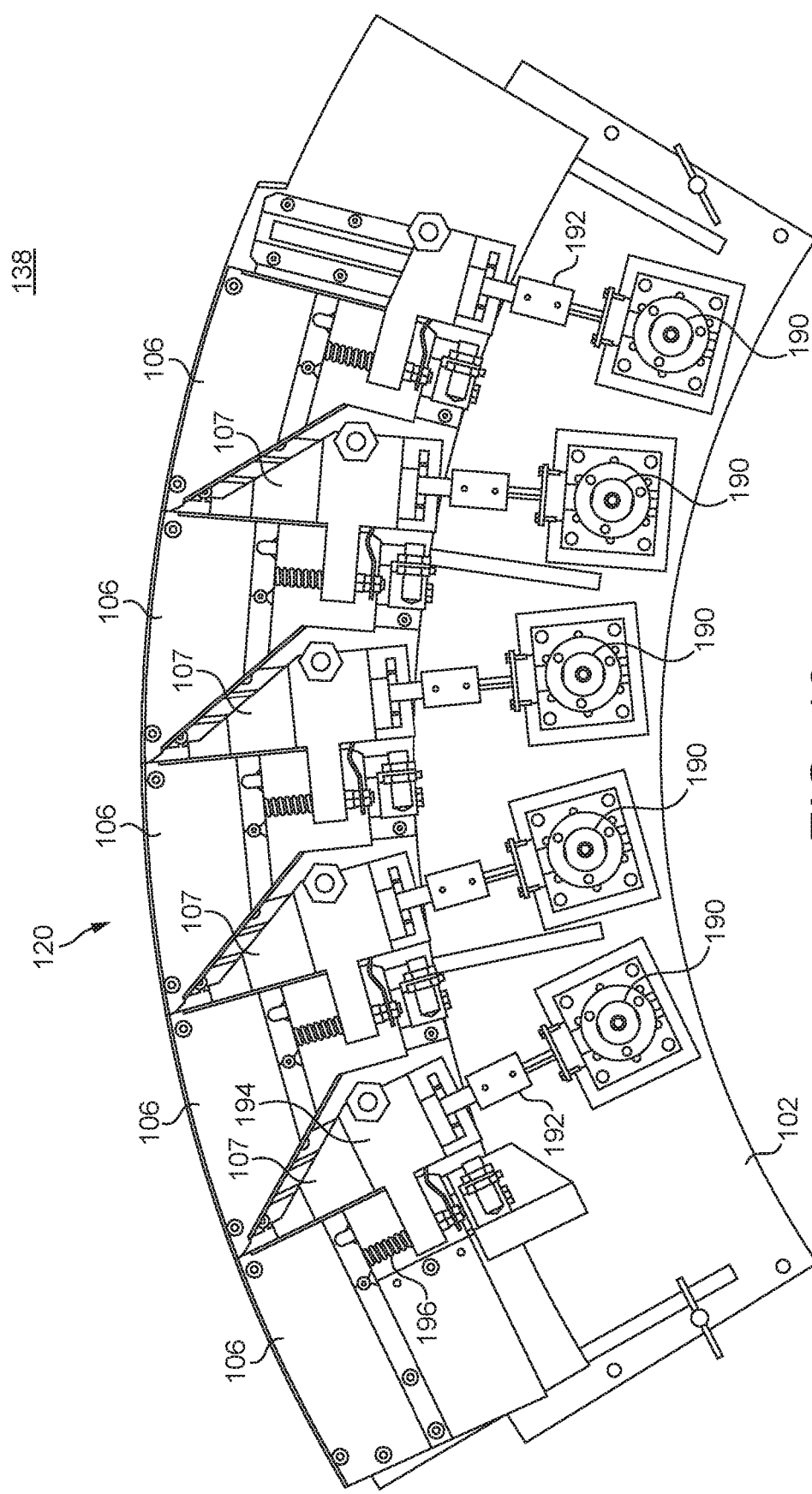

The invention will now be described, by way of example, with reference to the accompanying drawings, in which:

FIG. 1 schematically shows a cutaway view of a gas turbine engine;

FIG. 2 schematically shows the casing of the gas turbine engine of FIG. 1;

FIG. 3 schematically shows a partial cross-sectional view of an apparatus for manufacturing a composite component, in which a forming element of the apparatus is shown in a lay-up configuration;

FIG. 4 schematically shows a partial cross-sectional view of the apparatus of FIG. 3 in which the forming element has moved relative a body portion of the apparatus;

FIG. 5 schematically shows a partial cross-sectional view the apparatus of FIGS. 3 and 4 in which the forming element is in the forming configuration;

FIG. 6 schematically shows a radial view of a forming assembly of the apparatus in a lay-up configuration;

FIG. 7 schematically shows a plan view the forming assembly in the lay-up configuration;

FIG. 8 schematically shows a radial view of the forming assembly in a forming configuration;

FIG. 9 schematically shows a plan view of the forming assembly in the forming configuration;

FIG. 10 schematically shows actuation mechanisms for the forming assembly; and

Figure 11:
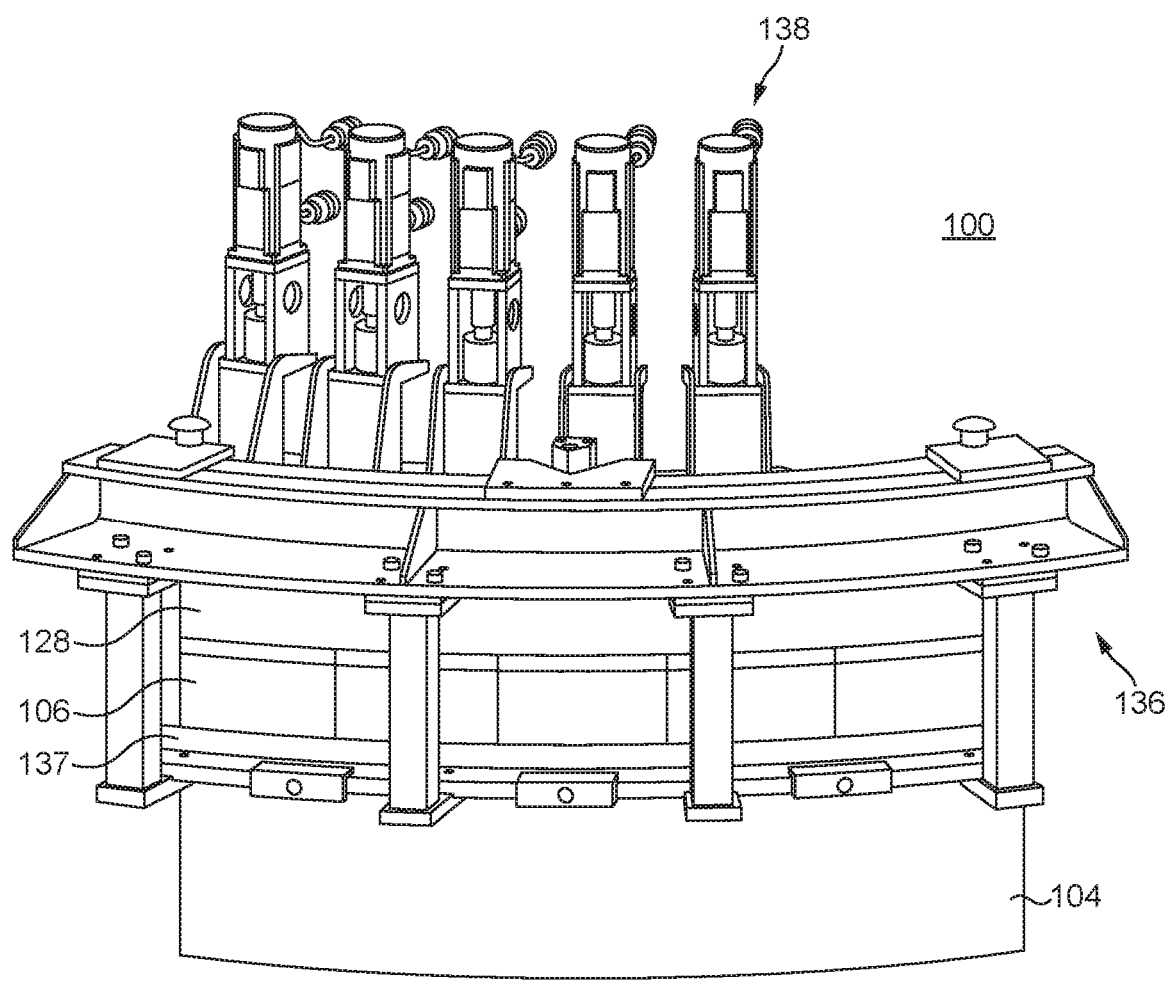

FIG. 11 schematically shows the apparatus of FIGS. 3-10 in perspective view.

FIG. 1 shows a gas turbine engine 10 comprising an exterior nacelle 12 supported on an annular casing 14 having forward and aft flanges 16, 18. The casing 14 is centred on the axis 20 of the engine 10 and houses a fan 22 comprising a plurality of fan blades. Forward and aft annular casing boxes 24, 26 support the front and rear portions of the nacelle 12.

As shown in FIG. 2, the casing 14 has a curved main body 28 which is generally cylindrical and is provided with forward and aft flanges 16, 18 extending radially outwardly with respect to the curvature of the main body.

The casing 14 is composed of composite material, such as Carbon Fibre Reinforced Polymer (CFRP). In particular, the casing 14 comprises a plurality of plies of pre-impregnated ("pre-preg") unidirectional composite tape that been have been applied to a mould in a lay-up process and cured.

FIGS. 3 to 5 show cross sectional views of an apparatus 100 for manufacturing the composite casing 14.

The apparatus 100 comprises a generally annular tool 102 that is configured to rest on a horizontal surface, such as a workshop floor, so that its central axis (not shown) extends vertically, although in other embodiments it may be supported in any orientation. The tool 102 comprises an annular support structure 103 for supporting a forming assembly 105 comprising a plurality of forming elements 106 and filler elements (not shown), and a body portion 104.

The body portion 104 comprises a plurality of circumferentially extending curved body panels 108 that together define a cylindrical lay-up surface 110 for a composite pre-form 200. In this embodiment, there are six curved body panels 108 each having an angular extent of 60°. The body portion 104 is provided with a body heater 114 comprising a plurality of heater mats 116 mounted to the radially inner surfaces of the curved body panels 108 for heating the body panels 108, and thereby a pre-form 200 disposed on the outer lay-up surface 110 of the body portion 104. In this example, the body panels 108 are composed of a thermally conductive metal, in particular, stainless steel or aluminium.

The forming assembly 105 is mounted to the support structure 103 above the body portion 104 by an actuation mechanism (not shown) and comprises a plurality of forming elements 106 which are radially movable with respect to the support structure 103 and the body portion 104 between a retracted or lay-up position (for example, FIG. 3) and an extended or forming position (for example, FIG. 5). The forming elements 106 are circumferentially arranged around the tool 102.

Each forming element 106 has a circumferentially extending radially outer lay-up surface 120 which is configured to be substantially contiguous and continuous with the lay-up surface 110 of the adjacent body portion 104 in the lay-up configuration of the forming assembly 105 (i.e. with the forming elements in the lay-up position). In the lay-up configuration, the lay-up surfaces 120 of the forming elements 106 are substantially continuous with each other around the axis of the tool 102.

In the forming configuration, the lay-up surfaces 120 of the forming elements are radially spaced apart from the lay-up surface 110 of the adjacent body portion 104, and there are circumferentially extending gaps between them.

The forming elements 106 are configured so that the lay-up surfaces 120 of each element 120 has a radius of curvature corresponding to the radial position of the lay-up surface 120 in the forming position. Accordingly, the lay-up surfaces 120 extend in a true circumferential direction when in the forming position, and extend approximately circumferentially (or substantially circumferentially) in the retracted or lay-up position.

In this example, each forming element 106 is in the form of a semi-annular block or sector that defines the radially outer lay-up surface 120 and has four radially extending sides: lower and upper side surfaces 122, 124 and angularly spaced side surfaces (not shown). The lower side surface 122 acts as a primary flange-forming surface during a forming operation, as will be described in detail below. In this embodiment, each main flange-forming portion 106 has an angular extent of 12°, and so the tool 102 comprises 30 separate main flange-forming portions.

Each main flange-forming portion 106 comprises a cavity 126 in which there is disposed a flange heater 123 for heating the main flange-forming portion 106. Each main flange-forming portion 106 is composed of a thermally conductive metal, in particular, stainless steel or aluminium. The flange heaters 123 and the body heater 114 are coupled to a controller (not shown) for controlling flange forming and curing operations, as will be described below.

As shown in FIGS. 6-9, the forming assembly 105 additionally comprises a plurality of filler elements 107. The filler elements 107 are in the form of semi-annular blocks configured to move from a radially inner retracted or lay-up position to a radially outer extended or forming position, corresponding to the lay-up and forming configurations of the forming assembly 105 respectively. The blocks have a radially outer filler surface 150, annular spaced side surfaces 152, 154, and lower and upper side surfaces 156, 158. The lower side surface 156 forms a secondary flange-forming surface during a forming operation, as will be described in detail below.

In the lay-up configuration (FIGS. 6 and 7), the filler elements 107 are disposed radially inwardly of the lay-up surfaces of the forming elements 106, so that the filler elements are concealed from a radially outer position. The forming elements 106 have tapered angularly spaced side surfaces 160, 162 which, in the lay-up configuration of the forming assembly, define between them a recess for receiving the filler elements 107 (as best shown in FIG. 7).

In the forming configuration (FIGS. 8 and 9), the filler elements 107 extend into the circumferentially extending gaps between the forming elements 106 so that the secondary flange-forming surface 156 of the filler elements 107 are substantially continuous with the primary flange-forming surfaces 122 of the forming elements 106. Additionally, in the forming configuration, the radially outer filler surface 150 extends into the circumferentially extending gaps between the lay-up surfaces 120 of the forming elements 106, so that the lay-up surfaces 120 and filler surfaces 150 form a substantially continuous circumferentially extending surface.

As shown in FIGS. 7 and 9, each filler element 107 comprises a male projection 164 on its first side surface 152 configured to engage with a corresponding female groove 166 formed in a second side surface 160 of an adjacent forming element 106. Similarly, each filler element 107 comprises a female groove 168 on its second side surface 154 configured to engage with a corresponding male projection 170 formed in the first side surface 162 of an oppositely adjacent forming element 106.

The male projections 164, 170 and the corresponding female grooves 166, 168 are elongate along the radial extent of the respective side surfaces 152, 162, 160, 154.

In this embodiment, the male projections 164, 170 are composed of brass, and the female grooves 166, 168 are defined by brass inserts received in the respective forming and filler elements 106, 107. The forming and filler elements 106, 107 are composed of a thermally conductive aluminium alloy. In this embodiment, the brass projections and grooves are harder than the aluminium alloy, and so are more resistant to the interlocking engagement which they are subjected to in use (see below).

The forming and filler elements 106, 107 are coupled to actuators (not shown) for moving them between the respective lay-up and extended positions.

Referring back to FIGS. 3-5, the tool 102 further comprises a generally cylindrical continuation portion 128 disposed above the forming assembly 105 and having a radially outer lay-up surface 130 arranged to be contiguous and continuous with the lay-up surfaces 120 of the forming elements 106 in the lay-up configuration. The continuation portion 128 is supported on the support structure 103 and comprises a plurality of continuation panels 131.

The lay-up surfaces 110, 120, 130 of the body portion 104, forming elements 106 and the continuation portion 128 of the tool 102 together define a generally cylindrical continuous lay-up surface 132 for laying up a cylindrical pre-form 200.

The tool 102 further comprises a plurality of attachment portions 134 angularly spaced around the circumferential extent of the tool 102 above the continuation portion 128 for coupling with a flange support structure 136. The flange support structure 136 is in the form of an annular frame configured to extend around a pre-form 200 disposed on the lay-up surface 132 of the tool and is detachably attachable to the tool 102 by cooperating attachment portions 134, 135 on the tool 102 and the flange support structure 136 respectively. For example, the attachment portions 134, 135 may be coupled by bolts.

The flange support structure 136 comprises a counteracting flange support portion 137 arranged to counteract the flange-forming surfaces 122, 156 of the forming elements 106 and filler elements 107 of the tool 102 respectively during a flange forming operation, so as to control the shape of the formed flange.

In particular, the counteracting flange support portion 137 is arranged to abut a pre-form 200 disposed on the lay-up surface of the tool and defines an annular counteracting forming surface 140 for shaping the flange region of the component as it is formed in the forming operation. The counteracting forming surface 140 is oriented substantially radially (horizontally in FIGS. 3-5) and positioned axially below the level of the flange-forming surfaces 122, 156 of the forming assembly 105 by a distance corresponding to the desired thickness of the flange. The counteracting forming surface 140 has a radially inner rounded bend or transition portion for forming a bend or transition region where the flange region and the main body region of the component meet. In this embodiment, the transition portion has a relatively low curvature so that there is a continuous bend between the main body and flange of the composite component. In particular, in this embodiment the flange-forming portion is arranged to form a flange having a radial extent of approximately 65 mm, and the radius of curvature for the flange is approximately 10 mm.

The flange support structure 136 also comprises an integral mounting and heating element by which the counteracting flange support portion 137 is mounted and heated for forming and curing.

FIG. 10 shows a drive mechanism 138 for the forming assembly. The drive mechanism 138 comprises a plurality of drive units, each having a rotary motor 190 for each pair of adjacent forming and filler elements 106, 107 and arranged to drive a linear guide rod 192 along a guide direction slightly offset from the radial direction (in other embodiments, the guide direction may be substantially radial). The guide rod 192 is coupled to a guide block 194 which is fixedly secured to the filler element 107, and is coupled to the forming element 106 by a compression spring 196. The guide block is constrained to move along guide rails (not shown) secured to the support structure 103. The drive units also include radial stops (not shown) for stopping the radial motion of the respective elements 106, 107. The drive units are configured to gradually drive the forming elements 106 and filler elements 107 from their respective lay-up positions to their respective forming positions. In particular, the compression spring 196 provides a lost-motion connection between the guide block 194 and the forming element 106 so that, in use, the forming element 106 reaches its respective forming position and the filler element 107 subsequently extends into its forming position between adjacent forming elements 106.

FIG. 11 shows a portion of the apparatus 100 corresponding to one sixth of the full annulus and in particular shows the arrangement of the tool 102 including the body portion 104, five forming elements 106, the continuation portion 128, together with the flange support structure 136 and a portion of the actuation mechanism 138 corresponding to the five flange-forming portions 106 shown.

A method of forming a composite component using the apparatus 100 will now be described, by way of example, with reference to FIGS. 3-11.

The apparatus 100 is oriented on a support surface, such as a floor, so that its central axis extends vertically. The apparatus 100 is prepared for a lay-up operation by detaching the flange support structure 132, if attached. Additionally, the actuation mechanism 138 (FIG. 10) is controlled to return the forming assembly 105 to the lay-up configuration. The forming elements 106 are circumferentially adjacent one another, and the male projection 170 of each forming element 106 engages with a corresponding female groove 166 of it's adjacent forming element, thereby axially aligning the forming elements 106 in the lay-up configuration.

With the forming assembly in the lay-up configuration (FIGS. 3, 6, 7) a continuous lay-up surface 132 is defined on the tool 102 by the radially outer surfaces of the body portion 104, the forming assembly 105 (the forming elements 106) and the continuation portion 128. This lay-up surface 132 is accessible from a radially outer position.

In this embodiment, a release layer (not shown) is overlaid on the lay-up surface 132 before the lay-up operation is initiated.

A lay-up operation is conducted in which unidirectional tapes of pre-impregnated composite material are applied over the continuous lay-up surface 132 in successive layers or plies using an automatic tape laying (ATL) apparatus, thereby forming a substantially cylindrical composite pre-form 200 on the tool 102. In this embodiment, the tapes are applied in a combination of ±60° and 90° (i.e. vertical) orientations with respect to a plane normal to the axis of the tool, and extend over the lay-up surfaces 110, 120, of the body portion 104 and the forming elements 106. In other example methods, the lay-up operation may be conducted by hand, or using other methods such as Automatic Fibre Placement (AFP) or automatic tape winding.

The composite material is applied to the tool to provide a pre-form having a body region 206 extending over the body portion 104 of the tool and a flange region 208 extending over the lay-up surfaces 120 of the forming elements. In other example methods, the flange region 208 may additionally extend part-way over the lay-up surface 130 of the continuation portion 128 of the tool, and/or there may be a continuation region of the pre-form extending from the flange region 208 that may be cut away from the flange after forming or curing.

In this example, the composite material is applied to the tool to provide a pre-form 200 for a casing for a gas turbine having an axial length of 1000 mm and a flange radius of 65 mm. The composite material is applied to the tool so that the body region 206 has an axial extent over the body portion 104 of 1000 mm and the flange region has an axial extent over the forming assembly of at least 65 mm.

Once the lay-up operation is complete, adhesive tapes 202 are applied in annular loops to the body portion 104 and continuation portion 128 below and above the pre-form 200 respectively, and a vacuum bag 204 is placed over the pre-form 200 and sealed with the tapes 202 against the tool 102.

Vacuum tubes (not shown) are extended through the vacuum bag to the space enclosed between the tool 102 and the vacuum bag 204, and a vacuum source such as a vacuum pump is applied to the vacuum tubes to create a partial vacuum in the space occupied by the pre-form 200. In this example, a partial vacuum is formed so that an unbalanced pressure force from the ambient atmosphere is applied through the vacuum bag onto the pre-form 200.

The forming operation is initiated by the controller causing the heating apparatus (i.e. the body heater 114 and flange heaters 123) to heat the pre-form 200 to a threshold forming temperature, which in this example is 80° C.

When the pre-form 200 has reached the threshold forming temperature, the controller causes the actuation mechanism 138 to drive the forming elements 106 and the filler elements radially outwardly from the lay-up configuration to the forming configuration (FIGS. 3-5 and 6-9). As the forming elements 106 move radially outwardly, circumferential gaps form between them and the filler elements 107 extend into these gaps.

The male projections 164 of the filler portions 107 engage with the female grooves 160 of the forming elements 106, and the male projections 170 of the forming elements 106 engage with the corresponding female grooves 168 of the filler elements 107, thereby axially aligning the forming and filler elements 106 and 107 as the forming assembly 105 moves to the forming configuration.

As the flange-forming portions 106 move radially outwardly, the flange region 208 of the pre-form is caused to slide over the lay-up surface 120 and onto the primary flange-forming surfaces 122 (i.e. the underside of the flange-forming portion 106) and the secondary flange-forming surface 156 (i.e. the underside of the filler portions 107), which together form a substantially continuous flange-forming surface. The movement of the flange-forming portions 106 causes the flange region 208 to plastically deform around and between the flange-forming surface 122, 156 and the flange-facing surface 140 of the counteracting support element 137, thereby forming the radial flange of the component.

During the forming operation, the body region 206 of the pre-form remains substantially in place against the body portion 104 of the tool 100, held in position by the counteracting support element 137. The forming assembly 105 is configured to move slowly during the forming operation, such as at approximately 120 mm per hour, to ensure that the layers of the composite pre-form 200 are able to move relative one another during the forming operation without creating wrinkles in the pre-form.

Once the flange forming operation is complete (FIGS. 5, 8, 9), the controller initiates a curing operation and causes the heating apparatus to heat the pre-form 200, including the formed flange and transition region, to at least a threshold curing temperature, which in this embodiment is 135° C. The controller also controls the vacuum source so that an unbalanced pressure force is applied to the pre-form through the vacuum bag.

After a curing period of 6 hours, the controller turns off the heaters and the cured casing 14 is allowed to cool on the tool 102. The flange support structure 136 is removed from the tool 102 and the vacuum bag and associated equipment is removed from the cured component. The flange assembly 105 is moved back to the lay-up configuration, and the cured casing 14 is removed from the tool.

The casing 14 is then trimmed to remove any continuation portion of the pre-form extending beyond the desired dimensions of the flange.

The invention allows a curved flanged component to be formed from a pre-form by driving forming elements radially outwardly during a forming process, despite the inherent problem that circumferential gaps will form between the forming elements. The filler elements of the forming assembly are configured to move into the respective gaps so as to provide a substantially continuous flange-forming surface. Further, the complementary features of the forming and filler elements improve the axial alignment of the flange-forming surface so that the flange is of the desired shape, such as substantially planar (i.e. radially extending). In particular, there may be a degree of axial play in the actuation mechanism for the forming assembly, which may otherwise affect the axial alignment of the flange-forming surface. For instance, there may be axial play between the filler elements (attached to the guide block) and the guide rails, and/or axial play between the guide block and the forming element, which are coupled by a compression spring. Accordingly, the complementary features of the elements, such as the male and female interlocking projections and grooves, serve to axially align the forming elements during the forming operation and in the forming configuration.

The expression substantially continuous is intended to mean that there is no step change in the profile of a surface defined across two or more surfaces.

The invention claimed is:

1. A tool for forming a composite component having a curved body and an integral flange from a pre-form, the tool comprising:
   a curved body portion having a lay-up surface; and
   a forming assembly having a lay-up configuration and a forming configuration, the forming assembly comprising:
   a plurality of forming elements each having a lay-up surface and a primary flange-forming surface, the forming elements being radially outwardly moveable from the lay-up configuration to the forming configuration, in which the forming elements are circumferentially spaced from one another;
   a plurality of filler elements each having a secondary flange-forming surface, the tiller elements being arranged to move into the circumferential gaps between the forming elements in the forming configuration so as to form a substantially continuous flange-forming surface; and
   wherein each pair of adjacent forming and filler elements have complementary features arranged to engage with each other to axially align the elements relative to each other in the forming configuration;
   wherein the complementary features of each pair of adjacent forming and filler elements comprise male and female interlocking features and wherein the complementary features of the forming elements are configured so that, in the lay-up configuration, the complementary features of the forming elements engage with each other to axially align the forming elements;
   wherein in use a pre-form is disposed on the layup surfaces of the curved body portion nd the forming elements, and
   wherein movement to the forming configuration causes the pre-form to be deformed between the continuous flange-forming surface and a counteracting forming surface to form the integral flange.

2. A tool according to claim 1, wherein the primary and secondary flange-forming surfaces extend at least partly radially.

3. A tool according to claim 1, wherein the forming elements and the filler elements are alternately arranged around the axis of the tool.

4. A tool according to claim 1, wherein the complementary features of each pair of adjacent forming and filler elements are arranged so that the primary and secondary forming surfaces are axially aligned to within a tolerance of 0.25 millimetres in the forming configuration.

5. A tool according to claim 1, wherein the complementary features of each pair of adjacent forming and filler elements are provided on side surfaces of the respective forming and filler elements.

6. A tool according to claim 1, wherein the complementary features of each pair of adjacent forming and filler elements comprises at least one shoulder formed on a first element of the pair and arranged to engage with a corresponding portion of a second element of the pair to limit axial movement of the second element relative the first element along a first axial direction.

7. A tool according to claim 6, wherein the complementary features of each pair of adjacent forming and filler elements comprise at least two shoulders arranged to limit axial movement of the second element relative the first element along two opposing axial directions.

8. A tool according to claim 1, wherein a first element of the pair of elements comprises a female groove and wherein a second element of the pair of elements comprises a male projection arranged to be received in the female groove.

9. A tool according to claim 1, wherein the material composition of the male feature is different from the material composition of the female feature.

10. A tool according to claim 1, wherein the material composition of the male and female features is different from the material composition of the remainder of the respective forming and filler elements forming the pair.

11. A tool according to claim 1, wherein each element comprises a male feature provided on a first side surface of the element for engaging with a corresponding female feature of a first adjacent element, and a female feature provided on an opposing second side surface of the element for engaging with a corresponding male feature of a second adjacent element.

12. A tool according to claim 1, further comprising a drive means for moving the forming assembly from the lay-up configuration to the forming configuration, the drive means comprising a plurality of drive units, each drive unit being arranged to move at least one forming element;
wherein each drive unit is configured to move the or each respective forming element and an adjacent filler element from respective retracted positions corresponding to the layup configuration to respective extended positions corresponding to the forming configuration;
wherein each drive unit is configured so that the respective filler element reaches its respective forming position after the forming element reaches its respective forming position; and
wherein a lost motion connection is provided between each drive unit and the respective forming element.

13. A tool according to claim 1, wherein the tool is for forming an annular or semi-annular component.

14. A tool according to claim 1, wherein the tool is for forming a casing for a gas-turbine engine.

15. A tool according to claim 1, wherein the complementary features are configured so that, in the lay-up configuration, the complementary features of the forming elements engage with the complementary features of the filler elements to axially align the forming elements and the filler elements.

16. Apparatus for forming a composite component having a curved body and an integral curved flange, the apparatus comprising:
a tool in accordance with claim 1; and
a counteracting support detachably attachable to the tool over a pre-form received on the tool, the counteracting support having a counteracting forming surface arranged to oppose the flange-forming surfaces of the forming assembly so that in use a region of the pre-form is deformed between the forming assembly and the counteracting support to form the flange of the component.

17. A method of forming a composite component having a curved body and an integral curved flange from a pre-form, the method comprising:
providing a pre-form over lay-up surfaces of a curved body portion and a plurality of forming elements of an apparatus in a lay-up configuration;
moving a forming assembly from the lay-up configuration to a forming configuration so that a plurality of filler elements move into gaps between the forming elements in the forming configuration so as to form a substantially continuous flange-forming surface;
whereby a region of the pre-form is deformed between the continuous flange-forming surface and the counteracting forming surface to form the integral flange,
wherein the apparatus comprises:
the curved body portion having a lay-up surface; and
the forming assembly having the lay-up configuration and the forming configuration, the forming assembly comprising:
the plurality of forming elements each having a lay-up surface and a primary flange-forming surface, the forming elements being radially outwardly moveable from the lay-up configuration to the forming configuration, in which the forming elements are circumferentially spaced from one another;
the plurality of filler elements each having a secondary flange-forming surface, the filler elements being arranged to move into the circumferential gaps between the forming elements in the forming configuration so as to form a substantially continuous flange-forming surface;
wherein each pair of adjacent forming and filler elements have complementary features arranged to engage with each other to axially align the elements relative to each other in the forming configuration;
wherein the complementary features of each pair of adjacent forming and filler elements comprise male and female interlocking features and wherein the configuration, the complementary features of the forming elements are configured so that, in the lay-up axially align the forming elements;
wherein in use the pre-from is disposed on the layup surface of the curved body portion and the forming elements, and
wherein movement to the forming configuration causes the pre-form to be deformed between the continuous flange-forming surface and a counteracting forming surface to form the integral flange.

* * * * *

UNITED STATES PATENT AND TRADEMARK OFFICE
CERTIFICATE OF CORRECTION

PATENT NO. : 10,906,257 B2
APPLICATION NO. : 15/568346
DATED : February 2, 2021
INVENTOR(S) : Scott Barber Page 1 of 1

It is certified that error appears in the above-identified patent and that said Letters Patent is hereby corrected as shown below:

In the Claims

In Column 10, Line 33, in Claim 1, delete "tiller" and insert --filler-- therefor In Column 10, Line 51, in Claim 1, delete "nd" and insert --and-- therefor In Column 12, Lines 50-51, in Claim 17, after "wherein", delete "the configuration,"

In Column 12, Line 52, in Claim 17, after "lay-up", insert --configuration, the complementary features of the forming elements engage with each other to--

In Column 12, Line 54, in Claim 17, delete "pre-from" and insert --pre-form-- therefor In Column 12, Line 55, in Claim 17, delete "surface" and insert --surfaces-- therefor Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*